United States Patent
Chang et al.

(10) Patent No.: US 10,962,355 B2
(45) Date of Patent: Mar. 30, 2021

(54) 3D MODEL RECONSTRUCTION METHOD, ELECTRONIC DEVICE, AND NON-TRANSITORY COMPUTER READABLE STORAGE MEDIUM THEREOF

(71) Applicant: HTC Corporation, Taoyuan (TW)

(72) Inventors: Jui-Hsuan Chang, Taoyuan (TW); Cheng-Yuan Shih, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 29 days.

(21) Appl. No.: 16/231,617

(22) Filed: Dec. 24, 2018

(65) Prior Publication Data
US 2019/0197770 A1 Jun. 27, 2019

Related U.S. Application Data

(60) Provisional application No. 62/610,267, filed on Dec. 25, 2017.

(51) Int. Cl.
*G01B 11/24* (2006.01)
*G06T 17/10* (2006.01)
(Continued)

(52) U.S. Cl.
CPC .............. *G01B 11/24* (2013.01); *G01B 11/22* (2013.01); *G01S 17/86* (2020.01); *G01S 17/89* (2013.01);
(Continued)

(58) Field of Classification Search
CPC ......... G06T 17/00–30; G06T 19/00–20; G06T 2200/08; G06T 2210/56; G06T 7/00;
(Continued)

(56) References Cited

U.S. PATENT DOCUMENTS 7,800,736 B2  9/2010  Pack et al.
7,860,301 B2  12/2010  Se et al.
(Continued)

FOREIGN PATENT DOCUMENTS

CN  105164726 A  12/2015

OTHER PUBLICATIONS

NPL Video Titled "A Tutorial on Stereo Vision for 3D Depth Perception (Preview)", published Feb. 27, 2015; available for viewing at: https://www.youtube.com/watch?v=QTnv3YhuDcE (Year: 2015).*

(Continued)

*Primary Examiner* — Daniel F Hajnik
(74) *Attorney, Agent, or Firm* — CKC & Partners Co., LLC

(57) ABSTRACT

A 3D (three dimensional) model reconstruction method that includes the steps outlined below. Depth data of a target object corresponding to a current time spot is received. Camera pose data of the depth camera corresponding to the current time spot is received. Posed 3D point clouds corresponding to the current time spot are generated according to the depth data and the camera pose data. Posed estimated point clouds corresponding to the current time spot are generated according to the camera pose data corresponding to the current time spot and a previous 3D model corresponding to a previous time spot. A current 3D model of the target object is generated according to the posed 3D point clouds based on a difference between the posed 3D point clouds and the posed estimated point clouds.

22 Claims, 5 Drawing Sheets

(51) Int. Cl.
  *G06T 17/30* (2006.01)
  *G01B 11/22* (2006.01)
  *G06K 9/28* (2006.01)
  *G06K 9/32* (2006.01)
  *G01S 17/89* (2020.01)
  *G06T 17/00* (2006.01)
  *G06T 19/00* (2011.01)
  *G06T 7/33* (2017.01)
  *G01S 17/86* (2020.01)
  *G06K 9/46* (2006.01)

(52) U.S. Cl.
  CPC .............. *G06K 9/28* (2013.01); *G06K 9/3241* (2013.01); *G06K 9/4604* (2013.01); *G06T 7/33* (2017.01); *G06T 17/00* (2013.01); *G06T 17/10* (2013.01); *G06T 17/30* (2013.01); *G06T 19/006* (2013.01); *G06K 2209/401* (2013.01); *G06T 2200/04* (2013.01); *G06T 2200/08* (2013.01); *G06T 2207/10028* (2013.01); *G06T 2210/56* (2013.01)

(58) Field of Classification Search
  CPC .................. G06T 7/33; G06T 2200/04; G06T 2207/10028; G01B 11/22; G01B 11/24; G01S 17/86; G01S 17/89; G06K 9/28; G06K 9/3241; G06K 9/4604; G06K 2209/401
  See application file for complete search history.

(56) References Cited

U.S. PATENT DOCUMENTS

| | | | |
|---|---|---|---|
| 2015/0109415 A1* | 4/2015 | Son | G01B 11/22 |
| | | | 348/46 |
| 2016/0131761 A1* | 5/2016 | Yates | G01S 1/70 |
| | | | 356/3.11 |
| 2017/0064278 A1 | 3/2017 | Posselius et al. | |
| 2017/0372527 A1* | 12/2017 | Murali | G01S 17/894 |
| 2018/0018787 A1* | 1/2018 | Giancola | G06T 7/55 |
| 2018/0018805 A1* | 1/2018 | Kutliroff | G06T 7/90 |
| 2018/0190017 A1* | 7/2018 | Mendez | G06T 17/00 |

OTHER PUBLICATIONS

Corresponding Taiwan office action dated Dec. 11, 2019.

* cited by examiner

3D MODEL RECONSTRUCTION METHOD, ELECTRONIC DEVICE, AND NON-TRANSITORY COMPUTER READABLE STORAGE MEDIUM THEREOF

RELATED APPLICATIONS

This application claims priority to U.S. Application Ser. No. 62/610,267, filed Dec. 25, 2017, which is herein incorporated by reference.

BACKGROUND

Field of Invention

The present invention relates to a 3D model reconstruction technology. More particularly, the present invention relates to an electronic device, a 3D model reconstruction method and a non-transitory computer readable storage medium thereof.

Description of Related Art

Nowadays, computer vision methods are widely used in various applications. For example, in virtual reality (VR) or augmented reality (AR) application, computer vision methods are used for the VR/AR system to identify objects, real-world environment and/or scenes.

The most important step to reach the interaction between virtual and real object is to project the real sense into the virtual world precisely in real-time, called 3D model reconstruction. However, the bottleneck of high precision and low time consumption in 3D model reconstruction is camera pose estimation. If the camera pose estimation can not be performed accurately, the efficiency of 3D model reconstruction would decrease.

Accordingly, what is needed is an electronic device, a 3D model reconstruction method and a non-transitory computer readable storage medium thereof to address the issues mentioned above.

SUMMARY

An aspect of the present invention is to provide a 3D (three dimensional) model reconstruction method that includes the steps outlined below. Depth data of a target object corresponding to a current time spot is received from a depth camera. Camera pose data of the depth camera corresponding to the current time spot is received from at least one pose tracking sensor operated based on electromagnetic radiation. Posed 3D point clouds corresponding to the current time spot are generated according to the depth data and the camera pose data. Posed estimated point clouds corresponding to the current time spot are generated according to the camera pose data corresponding to the current time spot and a previous 3D model corresponding to a previous time spot. A current 3D model of the target object is generated according to the posed 3D point clouds based on a difference between the posed 3D point clouds and the posed estimated point clouds.

Another aspect of the present invention is to provide an electronic device that includes a processing circuit, a depth camera, at least one pose tracking sensor and a memory. The depth camera is electrically connected to the processing circuit. The pose tracking sensor is electrically connected to the processing circuit and arranged on the electronic device. The memory is electrically connected to the processing circuit and is configured to store at least one program configured to be executed by the processing circuit, the at least one program comprising instructions for performing a 3D model reconstruction method that includes the steps outlined below. Depth data of a target object corresponding to a current time spot is received from the depth camera. Camera pose data of the depth camera corresponding to the current time spot is received from the tracking sensor operated based on electromagnetic radiation. Posed 3D point clouds corresponding to the current time spot are generated according to the depth data and the camera pose data. Posed estimated point clouds corresponding to the current time spot are generated according to the camera pose data corresponding to the current time spot and a previous 3D model corresponding to a previous time spot. A current 3D model of the target object is generated according to the posed 3D point clouds based on a difference between the posed 3D point clouds and the posed estimated point clouds.

Yet another aspect of the present invention is to provide a non-transitory computer readable storage medium storing at least one program, comprising instructions, which when executed, causes a processing circuit to perform a 3-D model reconstruction method that includes the steps outlined below. Depth data of a target object corresponding to a current time spot is received from a depth camera. Camera pose data of the depth camera corresponding to the current time spot is received from at least one pose tracking sensor operated based on electromagnetic radiation. Posed 3D point clouds corresponding to the current time spot are generated according to the depth data and the camera pose data. Posed estimated point clouds corresponding to the current time spot are generated according to the camera pose data corresponding to the current time spot and a previous 3D model corresponding to a previous time spot. A current 3D model of the target object is generated according to the posed 3D point clouds based on a difference between the posed 3D point clouds and the posed estimated point clouds.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
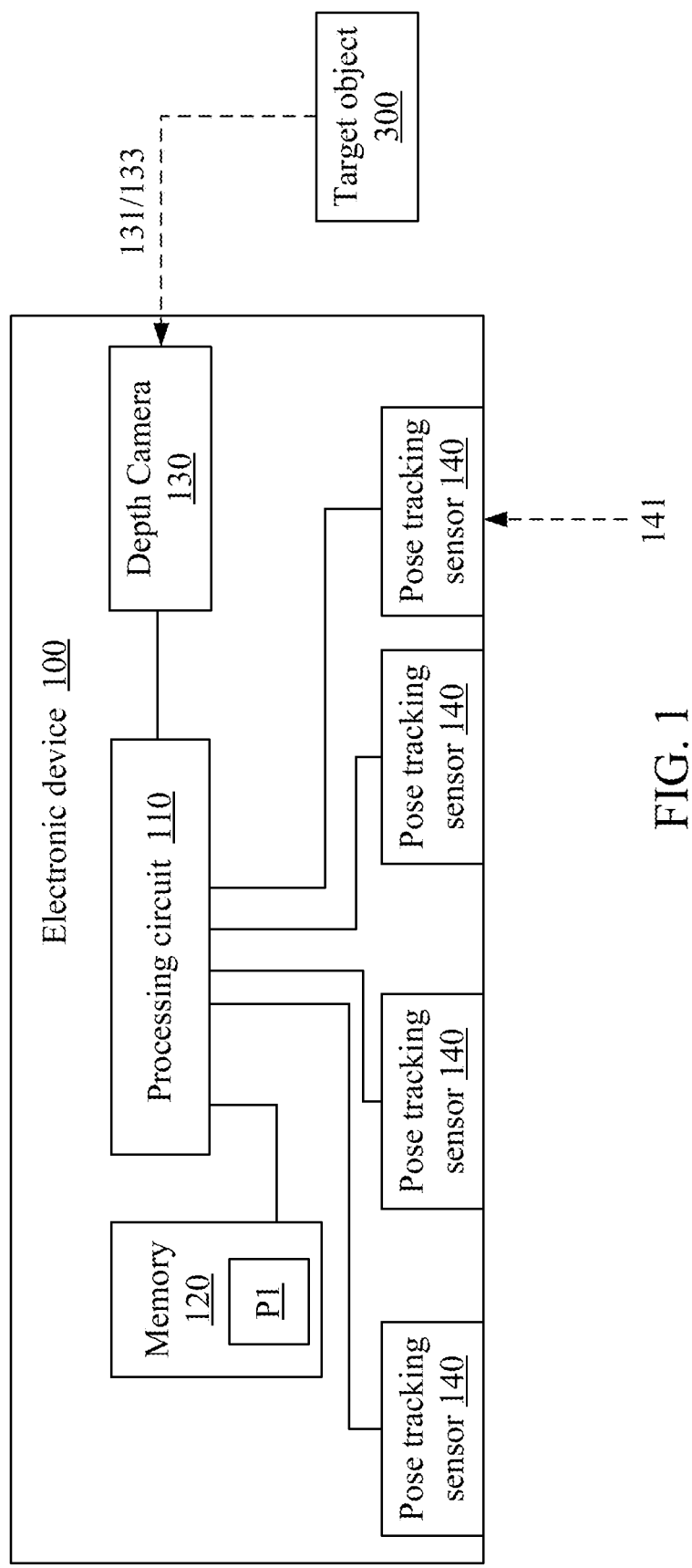
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating an electronic device 100 in accordance with some embodiments of the present disclosure. The electronic device 100 may be configured to perform a 3D model reconstruction and environment perception.

Specifically, in some embodiments, the electronic device 100 may be applied in a virtual reality (VR)/mixed reality (MR)/augmented reality (AR) system in order to integrate one or more objects in the physical/real-world environment into the virtual environment or virtual objects. The objects in the physical/real-world environment may be first identified by the 3D model reconstruction, such that the integration may be performed based on the identified results.

For example, the electronic device 100 may be realized by, a camera device, a standalone head mounted device (HMD) or VIVE HMD. In detail, the standalone HMD may handle such as processing location data of position and rotation, graph processing or others data calculation.

As shown in FIG. 1, the electronic device 100 includes a processing circuit 110, a memory 120, a depth camera 130, four pose tracking sensors 140. At least one program P1 are stored in the memory 120 and configured to be executed by the processing circuit 110, in order to perform the 3D model reconstruction.

In structural, the memory 120 and the depth camera 130 are respectively electrically connected to the processing circuit 110.

The depth camera 130 is configured to capture image data 131 and depth data 133 of a target object 300. In an embodiment, the depth camera 130 is a RGBD camera, in which the image data 131 includes RGB color information and the depth data 133 includes depth information.

The pose tracking sensors 140 are arranged on the electronic device 100 and electrically connected to the processing circuit 110. It is appreciated that the number of the pose tracking sensors 140 illustrated in FIG. 1 is merely an example. In other embodiments, the number of the pose tracking sensors 140 can be one or more than one.

In an embodiment, the pose tracking sensors 140 are operated based on electromagnetic radiation to receive camera pose data 141 of the depth camera 130.

More specifically, the pose tracking sensors 140 may be used for a lighthouse tracking system to perform lighthouse tracking in order to detect the position and/or the movement of the electronic device 100. In some embodiments, the pose tracking sensors 140 may also be realized by a RGB camera, a RGBD camera, an infrared camera, or other suitable sensors that can sense electromagnetic radiation, but the present disclosure is not limited in this regard.

In some embodiments, the processing circuit 110 can be realized by, for example, one or more processors, such as central processors and/or microprocessors, but are not limited in this regard.

In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

Figure 2:
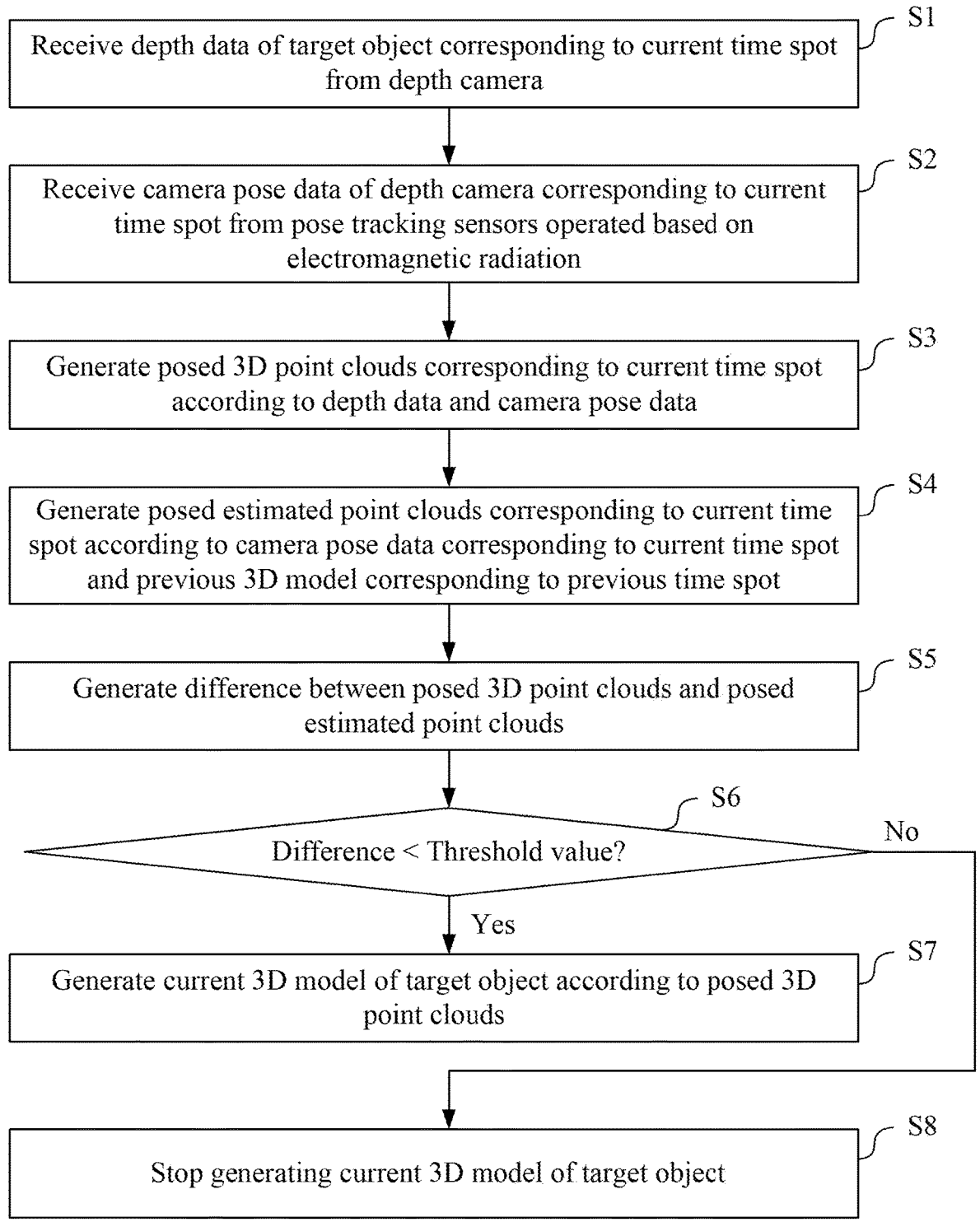
FIG. 2 is a flowchart illustrating a 3D model reconstruction method in accordance with some embodiments of the present disclosure.
Figure 3A:
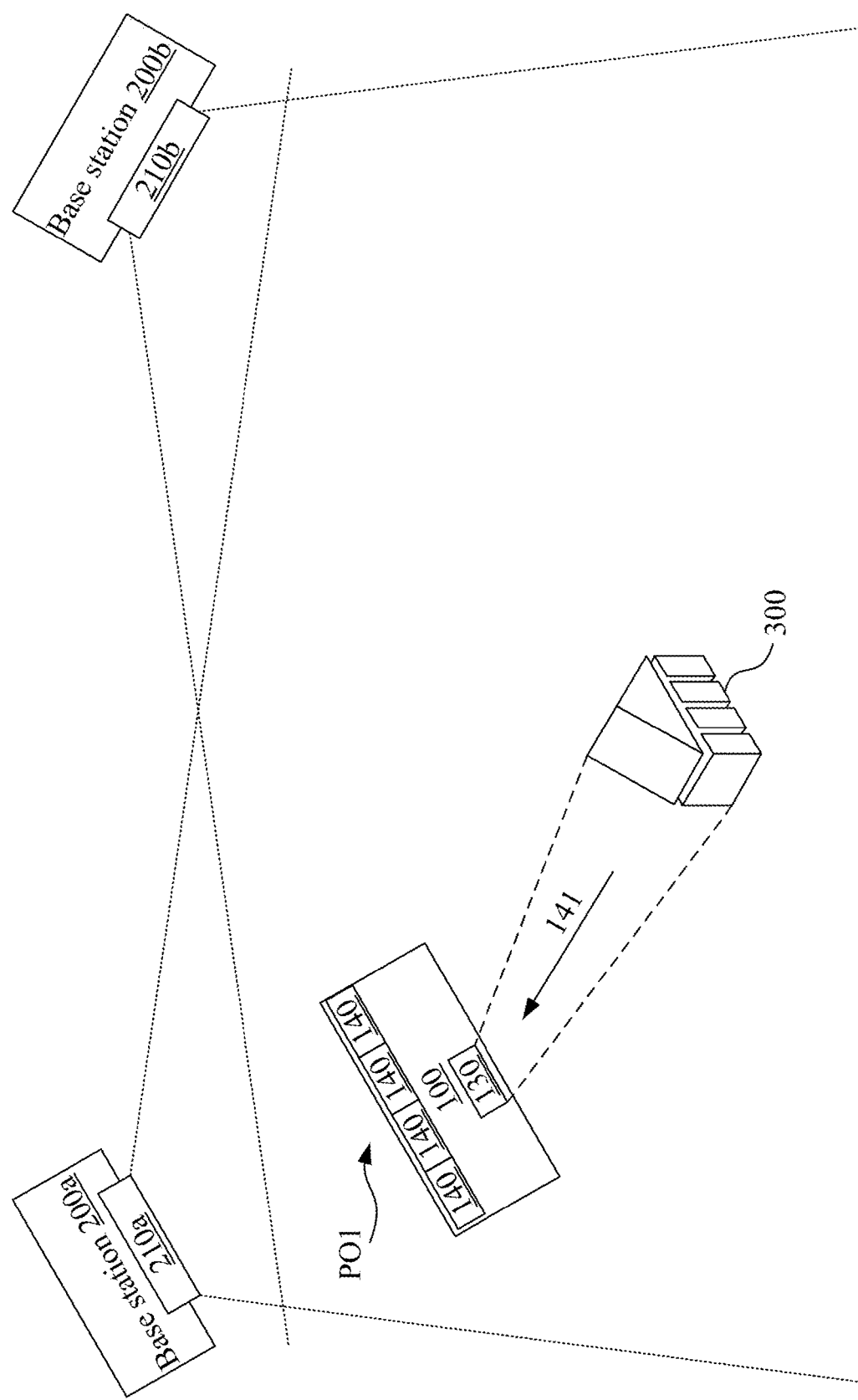
FIG. 3A and FIG. 3B are diagrams illustrating the operation of the electronic device at different time spots according to some embodiments of the present disclosure.
Figure 3B:
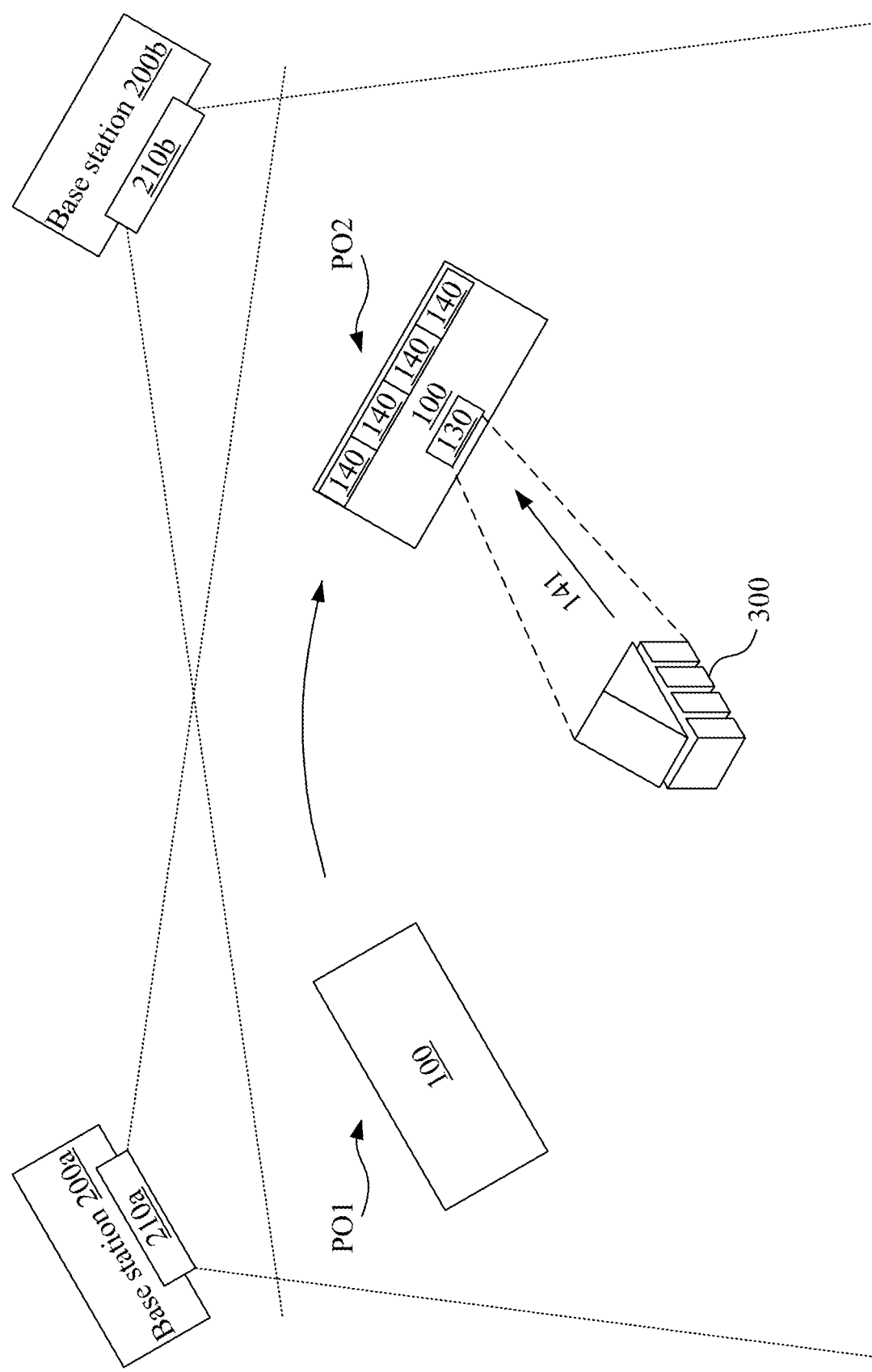

For better understanding of the present disclosure, the detailed operation of the electronic device 100 will be discussed in accompanying with the embodiments shown in FIG. 2, FIG. 3A and FIG. 3B. FIG. 2 is a flowchart illustrating a 3D model reconstruction method 500 in accordance with some embodiments of the present disclosure. FIG. 3A and FIG. 3B are diagrams illustrating the operation of the electronic device 100 at different time spots according to some embodiments of the present disclosure.

It should be noted that the 3D model reconstruction method 500 can be applied to an electrical device having a structure that is the same as or similar to the structure of the electronic device 100 shown in FIG. 1. To simplify the description below, the embodiments shown in FIG. 1 will be used as an example to describe the 3D model reconstruction method 500 according to some embodiments of the present disclosure. However, the present disclosure is not limited to application to the embodiments shown in FIG. 1.

The 3D model reconstruction method 500 includes the operations outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In operation S1, the depth data 133 of the target object 300 corresponding to a current time spot is received from the depth camera 130.

As shown in FIG. 3A and FIG. 3B, in some embodiments, the depth camera 130 moves around the target object 300 and capture the depth data 133 in various relative positions of the viewpoints.

For example, in FIG. 3A, at the time spot T1, the electronic device 100 and the depth camera 130 are located at the position PO1, and the depth data 133 corresponding to the time spot T1 is obtained by the depth camera 130. In FIG. 3B, at the time spot T2, the electronic device 100 and the depth camera 130 are located at the position PO2, and the depth data 133 corresponding to the time spot T2 is obtained by the depth camera 130. In an embodiment, the current time spot is the time spot T2, while the previous neighboring time spot is the time point T1.

In operation S2, the camera pose data 141 of the depth camera 130 corresponding to the current time spot from the pose tracking sensors 140 operated based on electromagnetic radiation.

As shown in FIG. 3A and FIG. 3B, in some embodiments, the lighthouse tracking system may include electromagnetic radiation emitters 210a, 210b arranged in the lighthouse base stations 200a, 200b in the physical/real-world environment. The lighthouse base stations 200a, 200b having electromagnetic radiation emitters 210a, 210b are configured to positioning the electronic device 100 and/or detecting orientation, such as tilt angles or rotating angles, of the electronic device 100 with the co-operation of the pose tracking sensors 140 and the processing circuit 110.

More specifically, the electromagnetic radiation emitters 210a, 210b are configured to provide electromagnetic radiation beams, and the pose tracking sensors 140 are configured to detect the electromagnetic radiation beams emitted by the electromagnetic radiation emitters 210a, 210b to obtain the camera pose data 141 of the depth camera 130 accordingly. Alternatively stated, the processing circuit 110 may obtain the camera pose data 141 of the depth camera 130 based on the electromagnetic radiation beams detected by the pose tracking sensors 140.

In an embodiment, the electromagnetic radiation emitters 210a, 210b are laser emitters, while the pose tracking sensors 140 are light sensors.

In operation S3, posed 3D point clouds corresponding to the current time spot are generated according to the depth data 133 and the camera pose data 141.

In an embodiment, a depth map conversion is performed on the depth data 133 to generate 3D point clouds with depth. Further, the camera pose data 141 is performed on the 3D point clouds such that these points with depth are projected to the real world coordinate system to generate the posed 3D point clouds.

In operation S4, posed estimated point clouds corresponding to the current time spot are generated according to the camera pose data 141 corresponding to the current time spot and a previous 3D model M1 corresponding to the previous time spot.

In an embodiment, by performing ray-casting surface scan on the previous 3D model M1, estimated point clouds can be generated. Further, by applying the camera pose data 141 to the estimated point clouds, the posed estimated point clouds can be generated.

In operation S5, a difference between the posed 3D point clouds and the posed estimated point clouds is generated.

Figure 4:
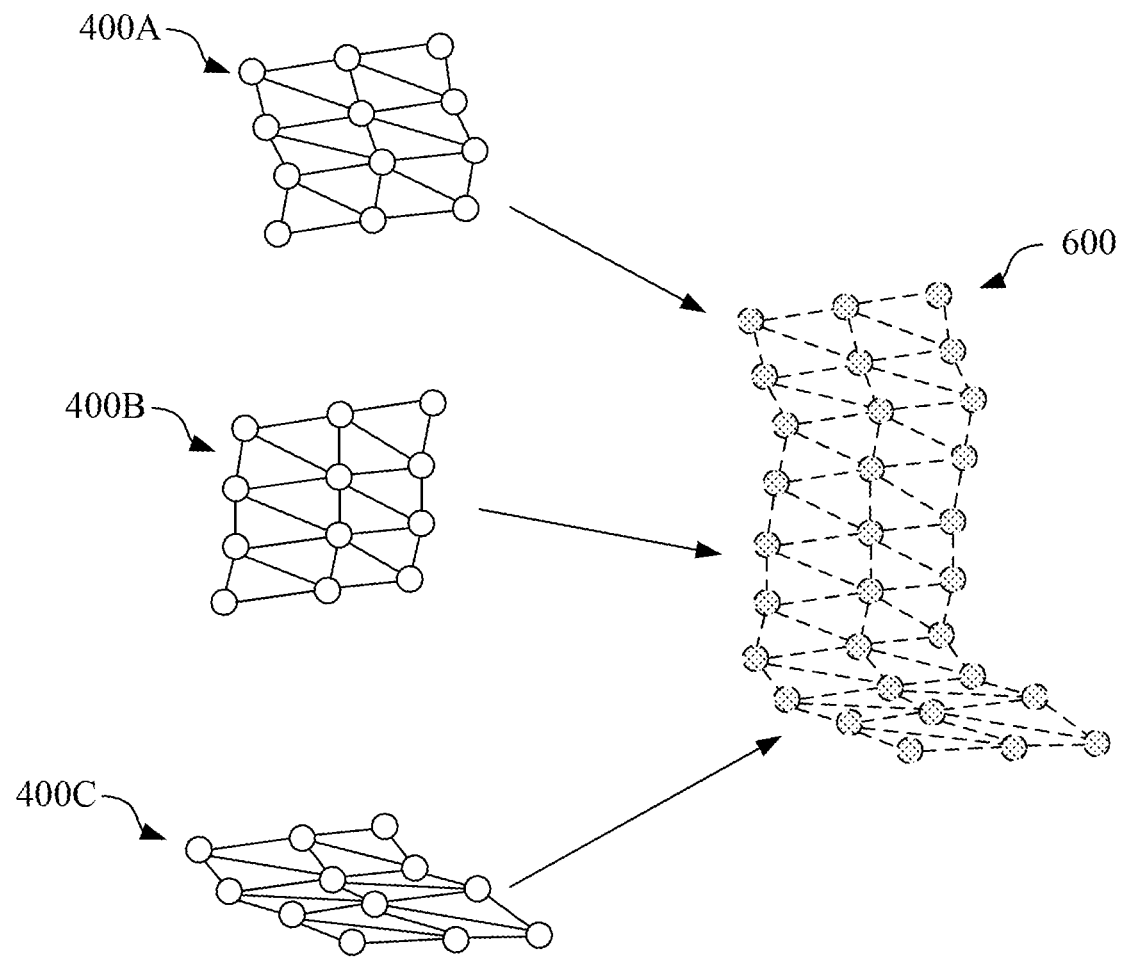
FIG. 4 is a diagram of posed 3D point clouds corresponding to different time spots and the posed estimated point clouds in accordance with some embodiments of the present disclosure.

Reference is made to FIG. 4. FIG. 4 is a diagram of posed 3D point clouds 400A, 400B, 400C corresponding to different time spots and the posed estimated point clouds 600 in accordance with some embodiments of the present disclosure.

In an embodiment, each set of the posed 3D point clouds 400A, 400B, 400C forms a surface. The posed estimated point clouds 600 includes a plurality sets of point clouds each corresponding to a time spot and each forming a surface too.

At each time spot, the posed 3D point clouds 400A, 400B, 400C would be respectively compared with the posed estimated point clouds 600 established based on the 3D model M1 built in the previous time spot.

In an embodiment, an overlapped region between the surface formed by the posed 3D point clouds and surface formed by the posed estimated point clouds calculated first.

Subsequently, corresponding features between the overlapped region are determined, in which the corresponding features may include such as, but not limited to a color, a distance and a normal vector of the surfaces formed by the posed 3D point clouds and the posed estimated point clouds.

Further, the difference is determined based on a number of a plurality of corresponding valid points between the posed 3D point clouds and the posed estimated point clouds.

In operation S6, whether the difference is smaller than a threshold value is determined. More specifically, in an embodiment, the numbers of valid points and invalid points are determined such that the difference is smaller when the number of the valid points is more and the number of the invalid points is fewer.

In operation S7, a current 3D model of the target object 300 is generated according to the posed 3D point clouds when the difference is smaller than the threshold value.

In an embodiment, the surface of the 3D model of the target object 300 is built based on the rotation matrix and the translation vector of the camera pose of the posed 3D point clouds. For example, the rotation matrix, the translation vector, and the result of ray-casting may be used to build the surface of the 3D model.

On the other hand, when the difference is not smaller than the threshold value, in operation S8, the current 3D model of the target object 300 is stopped to be generated.

In the present embodiment, the current 3D model of the target object 300 corresponds to the time spot T2 and can be used as the previous 3D model when new depth data 133 and new camera pose data 141 corresponding to the time spot T3 next to the time spot T2 are received to perform the operations described above to generate the 3D model corresponding to the time spot T3 when the difference between the posed 3D point clouds generated based on the data of time spot T3 and the posed estimated point clouds generated based the 3D model corresponding to the time spot T2 is smaller than the threshold value.

In some approaches, an iterative closest point (ICP) algorithm is used as the camera pose estimator by minimizing the difference between two point clouds in 3D model reconstruction. However, ICP has a fatal drawback of low moving speed because of the linearized assumption and the lost-tracking avoidance that results in bad experience when the 3D model reconstruction is used in AR and MR.

The electronic device and the 3D model reconstruction method of the present invention utilizes the pose tracking sensors operated based on electromagnetic radiation to accomplish a fast and accurate estimation of the poses to overcome the moving speed limitation problem. The 3D model reconstruction can thus be quickly established.

When the pose tracking sensors fail to track the pose at a certain time spot due to such as, but not limited to the speed that is too high, such that the difference between the posed 3D point clouds and the posed estimated point clouds is not smaller than the threshold value, the 3D model of the target object is stopped to be generated.

In an embodiment, the 3D model reconstruction is not performed until the difference between the latest posed 3D point and the posed estimated point clouds generated according to the last built 3D model is smaller than the threshold value.

It should be noted that, in some embodiments, the 3D model reconstruction method 500 may be implemented as a computer program. When the computer program is executed by a computer, an electronic device, or the processing circuit 110 in FIG. 1, this executing device performs the 3D model reconstruction method 500. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned 3D model reconstruction method 500, no particular sequence is required unless otherwise specified. Moreover, the operations may also be performed simultaneously or the execution times thereof may at least partially overlap.

Furthermore, the operations of the 3D model reconstruction method 500 may be added to, replaced, and/or eliminated as appropriate, in accordance with various embodiments of the present disclosure.

Through the operations of various embodiments described above, a 3D model reconstruction method is implemented to reconstruction and output a 3D model of the target object for the application in the VR, AR or MR by using lighthouse tracking system with the comparison between the camera pose generated according to the depth data and the camera pose estimation generated according to the previous 3D model instead of using the Iterative Closest Point process.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A 3D (three dimensional) model reconstruction method, comprising:
    receiving depth data of a target object corresponding to a current time spot from a depth camera;
    receiving camera pose data of the depth camera corresponding to the current time spot from at least one pose tracking sensor of an external tracking system rather than the depth camera;
    generating posed 3D point clouds corresponding to the current time spot according to the depth data and the camera pose data;
    generating posed estimated point clouds corresponding to the current time spot according to the camera pose data corresponding to the current time spot and a previous 3D model corresponding to a previous time spot, further comprising:
        performing a ray-casting surface scan on the previous 3D model to generate an estimated point clouds, and
        applying the camera pose data to the estimated point clouds to generate the posed estimated point clouds; and
    generating a current 3D model of the target object according to the posed 3D point clouds based on a difference between the posed 3D point clouds and the posed estimated point clouds.

2. The 3D model reconstruction method of claim 1, wherein the depth camera is disposed on an electronic device, the 3D model reconstruction method further comprises:
    capturing the depth data of the target object by the depth camera when the electronic device moves around the target object.

3. The 3D model reconstruction method of claim 2, further comprising:
    providing a plurality of electromagnetic radiation beams by at least one electromagnetic radiation emitters; and
    detecting the electromagnetic radiation beams by the at least one pose tracking sensors disposed on the electronic device to obtain the camera pose data accordingly.

4. The 3D model reconstruction method of claim 1, further comprising:
    calculating an overlapped region between the posed 3D point clouds and the posed estimated point clouds;
    comparing corresponding features between the overlapped region; and
    determining the difference based on a number of a plurality of corresponding valid points between the posed 3D point clouds and the posed estimated point clouds.

5. The 3D model reconstruction method of claim 1, wherein a plurality of features comprise a color, a distance and a normal vector of surfaces formed by the posed 3D point clouds and the posed estimated point clouds.

6. The 3D model reconstruction method of claim 1, wherein the step of generating posed 3D point clouds further comprises:
  performing a depth map conversion on the depth data to generate 3D point clouds; and
  applying the camera pose data on the 3D point clouds to generate the posed 3D point clouds.

7. The 3D model reconstruction method of claim 1, further comprising:
  generating the current 3D model of the target object according to the posed 3D point clouds when the difference is smaller than a threshold value; and
  stopping generating the current 3D model of the target object when the difference is not smaller than the threshold value.

8. The 3D model reconstruction method of claim 1, further comprising:
  providing a plurality of electromagnetic radiation beams by at least one electromagnetic radiation emitter, wherein the electromagnetic radiation emitter is arranged in a base station positioned in a physical space, the electromagnetic radiation emitter is a laser emitter, and the electromagnetic radiation beams are laser beams.

9. The 3D model reconstruction method of claim 8, wherein:
  the base station, the electromagnetic radiation emitter, and the pose tracking sensor form a lighthouse tracking system;
  the depth camera is connected to a processing circuit; and
  the camera pose data of the depth camera is obtained by the processing circuit based on the electromagnetic radiation beams detected by the pose tracking sensor.

10. An electronic device, comprising:
  a processing circuit;
  a depth camera electrically connected to the processing circuit;
  at least one pose tracking sensor electrically connected to the processing circuit and arranged on the electronic device; and
  a memory electrically connected to the processing circuit and configured to store at least one program configured to be executed by the processing circuit, the at least one program comprising instructions for performing a 3D model reconstruction method comprising:
    receiving depth data of a target object corresponding to a current time spot from the depth camera;
    receiving camera pose data of the depth camera corresponding to the current time spot from the pose tracking sensor of an external tracking system rather than the depth camera;
    generating posed 3D point clouds corresponding to the current time spot according to the depth data and the camera pose data;
    generating posed estimated point clouds corresponding to the current time spot according to the camera pose data corresponding to the current time spot and a previous 3D model corresponding to a previous time spot, further comprising:
      performing a ray-casting surface scan on the previous 3D model to generate an estimated point clouds, and
      applying the camera pose data to the estimated point clouds to generate the posed estimated point clouds; and
    generating a current 3D model of the target object according to the posed 3D point clouds based on a difference between the posed 3D point clouds and the posed estimated point clouds.

11. The electronic device of claim 10, wherein the depth camera is disposed on the electronic device, the 3D model reconstruction method further comprises:
  capturing the depth data of the target object by the depth camera when the electronic device moves around the target object.

12. The electronic device of claim 11, wherein the 3D model reconstruction method further comprises:
  providing a plurality of electromagnetic radiation beams by at least one electromagnetic radiation emitters; and
  detecting the electromagnetic radiation beams by the at least one pose tracking sensors disposed on the electronic device to obtain the camera pose data accordingly.

13. The electronic device of claim 10, wherein the 3D model reconstruction method further comprises:
  calculating an overlapped region between the posed 3D point clouds and the posed estimated point clouds;
  comparing corresponding features between the overlapped region; and
  determining the difference based on a number of a plurality of corresponding valid points between the posed 3D point clouds and the posed estimated point clouds.

14. The electronic device of claim 10, wherein a plurality of features comprise a color, a distance and a normal vector of surfaces formed by the posed 3D point clouds and the posed estimated point clouds.

15. The electronic device of claim 10, wherein the step of generating posed 3D point clouds further comprises:
  performing a depth map conversion on the depth data to generate 3D point clouds; and
  applying the camera pose data on the 3D point clouds to generate the posed 3D point clouds.

16. The electronic device of claim 10, wherein the 3D model reconstruction method further comprises:
  generating the current 3D model of the target object according to the posed 3D point clouds when the difference is smaller than a threshold value; and
  stopping generating the current 3D model of the target object when the difference is not smaller than the threshold value.

17. A non-transitory computer readable storage medium storing at least one program, comprising instructions, which when executed, causes a processing circuit to perform a 3D model reconstruction method comprising:
  receiving depth data of a target object corresponding to a current time spot from a depth camera;
  receiving camera pose data of the depth camera corresponding to the current time spot from at least one pose tracking sensor of an external tracking system rather than the depth camera;
  generating posed 3D point clouds corresponding to the current time spot according to the depth data and the camera pose data;
  generating posed estimated point clouds corresponding to the current time spot according to the camera pose data corresponding to the current time spot and a previous 3D model corresponding to a previous time spot, further comprising:
    performing a ray-casting surface scan on the previous 3D model to generate an estimated point clouds, and
    applying the camera pose data to the estimated point clouds to generate the posed estimated point clouds; and generating a current 3D model of the target object according to the posed 3D point clouds based on a difference between the posed 3D point clouds and the posed estimated point clouds.

18. The non-transitory computer readable storage medium of claim 17, wherein the depth camera is disposed on an electronic device, the 3D model reconstruction method further comprises:

capturing the depth data of the target object by the depth camera when the electronic device moves around the target object.

19. The non-transitory computer readable storage medium of claim 18, wherein the 3D model reconstruction method further comprises:

providing a plurality of electromagnetic radiation beams by at least one electromagnetic radiation emitters; and detecting the electromagnetic radiation beams by the at least one pose tracking sensors disposed on the electronic device to obtain the camera pose data accordingly.

20. The non-transitory computer readable storage medium of claim 17, wherein the 3D model reconstruction method further comprises:

calculating an overlapped region between the posed 3D point clouds and the posed estimated point clouds;

comparing corresponding features between the overlapped region; and determining the difference based on a number of a plurality of corresponding valid points between the posed 3D point clouds and the posed estimated point clouds.

21. The non-transitory computer readable storage medium of claim 17, wherein a plurality of features comprise a color, a distance and a normal vector of surfaces formed by the posed 3D point clouds and the posed estimated point clouds.

22. The non-transitory computer readable storage medium of claim 17, wherein the step of generating posed 3D point clouds further comprises:

performing a depth map conversion on the depth data to generate 3D point clouds; and applying the camera pose data on the 3D point clouds to generate the posed 3D point clouds.

\* \* \* \* \*